US007218644B1

(12) United States Patent
Heinonen et al.

(10) Patent No.: US 7,218,644 B1
(45) Date of Patent: May 15, 2007

(54) DYNAMIC BANDWIDTH ALLOCATION FOR BLUETOOTH ACCESS POINT CONNECTIONS

(75) Inventors: Tomi Heinonen, Tampere (FI); Timo M. Laitinen, Tampere (FI); Jarkko Lempiö, Nokia (FI)

(73) Assignee: Nokia Corporation, Espoo (FI)

( * ) Notice: Subject to any disclaimer, the term of this patent is extended or adjusted under 35 U.S.C. 154(b) by 1029 days.

(21) Appl. No.: 10/156,094

(22) Filed: May 29, 2002

(51) Int. Cl.
*H04J 3/22* (2006.01)

(52) U.S. Cl. .................. 370/468; 370/477
(58) Field of Classification Search ........ 370/328–330, 370/230, 230.1, 234
See application file for complete search history.

(56) References Cited

U.S. PATENT DOCUMENTS

| 5,613,198 | A | | 3/1997 | Ahmadi et al. | |
|---|---|---|---|---|---|
| 6,097,733 | A | | 8/2000 | Basu et al. | |
| 7,023,798 | B2 | * | 4/2006 | Bourlas et al. | 370/230 |
| 2002/0003792 | A1 | | 1/2002 | Schmidl et al. | |
| 2002/0133589 | A1 | * | 9/2002 | Gubbi et al. | 709/225 |
| 2003/0202469 | A1 | * | 10/2003 | Cain | 370/230 |
| 2004/0203820 | A1 | * | 10/2004 | Billhartz | 455/452.1 |
| 2005/0025042 | A1 | * | 2/2005 | Hadad | 370/208 |
| 2005/0286559 | A1 | * | 12/2005 | Miernik et al. | 370/468 |

FOREIGN PATENT DOCUMENTS

| EP | 0 782 297 A2 | 7/1997 |
|---|---|---|
| EP | 0 782 297 A3 | 7/1997 |
| WO | WO 02/05453 A2 | 1/2001 |
| WO | WO 01/56323 | 8/2001 |

OTHER PUBLICATIONS

Specification of the Bluetooth System v1.0 B Dec. 1, 1999.*
Miller et al. "The Lower Protocols of the Transport Group", Bluetooth Revealed, 2002, Chapter 6, pp. 77-122.
Miller et al. "The Upper Protocls of the Transport Group", Bluetooth Revealed, 2002, Chapter 7, pp. 123-154.
Miller et al. "The Serial and Object Exchange Profiles", Bluetooth Revealed, 2002, Chapter 14, pp. 239-258.
"Bluetooth Whitepaper 1.1"; AU-SYSTEM; Jan. 2000; pp. 25.
Mc Daid "Routing Connections in Bluetooth", University of Limerick, Ireland, Apr. 22, 2000, pp. 1-91.

* cited by examiner

*Primary Examiner*—Hassan Kizou
*Assistant Examiner*—Salman Ahmed
(74) *Attorney, Agent, or Firm*—Morgan & Finnegan, L.L.P.

(57) ABSTRACT

A system and method is disclosed for dynamically allocating bandwidth among devices connected to a short-range radio communication link, wherein the link possesses a maximum allowable bandwidth (Max) for all connection. As devices request connection to the link, each device transmits a CoD device class, and a bandwidth requirement for each device, wherein a weighted value is derived therefrom. The invention proceeds according to protocol by comparing the bandwidth of a requesting device to the Max value of the link. If the bandwidth requirement<Max, then the connection is allowed. As additional devices request connection, the bandwidth requirement values are added together and are compared to the Max value. If the sum<Max, then each device is allocated it's a specific value of bandwidth, along with additional bandwidth that is derived from et weighted value. If the sum>Max, the requesting connection is denied.

24 Claims, 9 Drawing Sheets

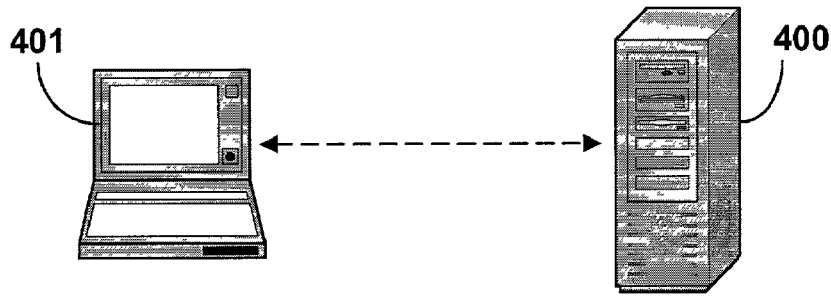
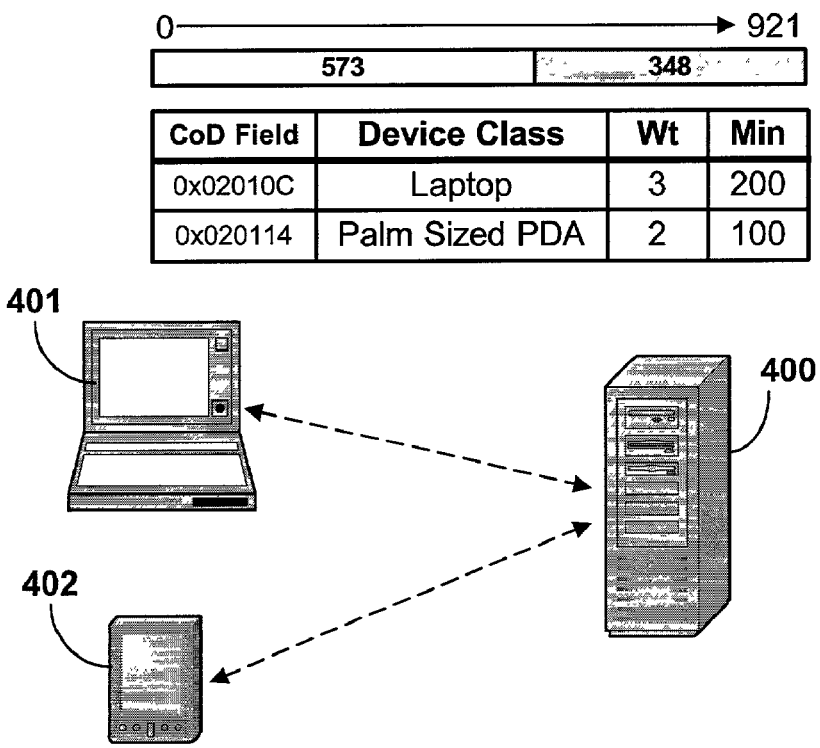
Figure 4A
Figure 4B

DYNAMIC BANDWIDTH ALLOCATION FOR BLUETOOTH ACCESS POINT CONNECTIONS

BACKGROUND OF THE INVENTION

1. Field of the Invention

The invention disclosed broadly relates to ubiquitous computing and more particularly relates to improvements in short range RF technology.

2. Background Art

Bluetooth is a short-range radio network, originally intended as a cable replacement. It can be used to create ad hoc networks of up to eight devices operating together. The Bluetooth Special Interest Group, *Specification Of The Bluetooth System*, Volumes 1 and 2, Core and Profiles: Version 1.1, Feb. 22, 2001, describes the principles of Bluetooth device operation and communication protocols. The devices operate in the 2.4 GHz radio band reserved for general use by Industrial, Scientific, and Medical (ISM) applications. Bluetooth devices are designed to find other Bluetooth devices within their ten-meter radio communications range and to discover what services they offer.

A connection between two Bluetooth devices is initiated by an inquiring device sending out an inquiry message searching for other devices or access points in its vicinity. Any other Bluetooth device or access point that is listening by means of conducting an inquiry scan, will recognize the inquiry message and respond. The inquiry response is a frequency hop synchronization (FHS) packet containing all of the information required by the inquiring device to address the responding device. This information includes clock value of the sender (i.e., the responding device), the sender's correct device access code, and the class-of-device (CoD) field. The access code includes the lower address part (LAP) and the upper address part (UAP) of the sender's Bluetooth Device Address (BD_ADDR), a unique, 48-bit IEEE address that is electronically engraved into each Bluetooth device.

The class-of-device (CoD) field of the FHS packet indicates which device class the sender belongs to, such as printer access point, network access point, PDA, cellular telephone, and the like. The class-of-device (CoD) field is a 24 bit field divided into three subfields and a two-bit format field. The high order eleven bit subfield is reserved for indicating general service classes such as information, telephony, audio, object transfer, capturing, rendering, networking, and positioning. The middle five bit subfield comprises the major device class, which can indicate up to 32 different device types. The low order six bit subfield consists is the minor device class, which can indicate up to 64 different variations of each device type. The lowest order two bits are the format field for identifying the format type of the CoD field.

The inquiring device will become the master and the responding device will become the slave in the eventual piconet, if a connection is established. To establish a connection, the inquiring device must enter the page state. The inquiring/paging device uses the information provided in the inquiry response packet, to prepare and send a paging message to the responding device. The inquiring/paging device uses the estimated clock CLK and access code of the responding device (i.e., the eventual slave device) to temporarily synchronize with it. Since the inquiring/paging device intends to be the master, it includes an assignment of an active member address (AM_ADDR) in the paging message. The paging message sent by the inquiring/paging device is also a frequency hop synchronization (FHS) packet containing all of the information required by the responding device to directly reply to the inquiring/paging device. This information includes clock value of the sender (i.e., the inquiring/paging device) and the inquiring/paging device's correct device access code. The responding device must be in the page scan state to allow the inquiring/paging device to connect with it. Once in the page scan state, the responding device will receive the paging packet that provides the clock timing and access code of the inquiring/paging device. The responding device responds with a page acknowledgment packet. This enables the two devices to form a connection and both devices transition into the connection state. The inquiring/paging device that has initiated the connection assumes the role of a master device and the responding device assumes the role of a slave device in a new ad hoc network piconet, using the CLK clock timing and access code of the master device.

Each piconet has one master device and up to seven active slave devices. All communication is directed between the master device and each respective slave device. The master initiates an exchange of data and the slave responds to the master. When two slave devices are to communicate with each other, they must do so through the master device. The master device maintains the piconet's network clock and controls when each slave device can communicate with the master device. Members of the ad hoc network piconet join and leave as they move into and out of the range of the master device. Piconets support distributed activities, such as multi-user gateways to the Internet or to a content server, wherein one device serves as the access point and is connected to an infrastructure network or content server. A user's device that joins a multi-user gateway piconet, does so to enable its user to access the infrastructure network or content server.

Bluetooth access points can deliver approximately 1 Mbps of bandwidth per each Bluetooth module to its client devices. In order to guarantee at least some portion of the bandwidth for each client, some intelligent bandwidth allocation method is required to allow each client device to reserve usable amounts of bandwidth. By preventing connection stalling, bandwidth "exhaustion" is avoided, and more efficient bandwidth allocation is provided.

SUMMARY OF THE INVENTION

According to an embodiment of the present invention, a system for reapportioning bandwidth for a wireless short-range radio communication link access point is disclosed comprising a short-range radio communication link interface, wherein said interface receives requests from remote devices, and further receives a CoD device class and a minimum bandwidth requirement (Min) for each requesting device; a storage medium, communicatively coupled to the interface, wherein storage medium stores CoD class device and Min values transmitted therewith; and a processor, communicatively coupled to the storage medium, wherein said processor calculates a weighted value for each CoD class device value received, and further initiates redistribution of bandwidth for the bandwidth short-range radio communication link according to the weighted value and Min value. The requests for connection are granted if the sum of all Min values for all requesting devices do not exceed the maximum bandwidth for the short-range radio communication link. Incoming requests for connection are not granted if the sum of all Min values for all previously connected devices, plus the Min value for an incoming request, exceeds the maximum bandwidth for the short-range radio communication link.

Under another embodiment, a method is disclosed of reapportioning bandwidth for a wireless short-range radio communication link access point comprising the assignment of a weighted value to each of a plurality of devices connected to the access point; determining a minimum bandwidth requirement for each of the plurality of devices; reapportioning bandwidth among each of the devices according to their minimum bandwidth requirements; and assigning additional bandwidth to each of the devices according to the weighted value. The weighted value is associated with each device's CoD and device class, and assigning additional bandwidth is repeated each time additional devices are connected to the access point.

DESCRIPTION OF THE FIGURES

FIG. 4A illustrates a connection between a laptop and a Bluetooth access point, and further discloses an exemplary bandwidth distribution under an embodiment of the present invention;

FIG. 4B illustrates a connection among a laptop, a PDA, and a Bluetooth access point, and further discloses an exemplary bandwidth distribution under an embodiment of the present invention;

DISCUSSION OF THE INVENTION

In the following description of the various embodiments, reference is made to the accompanying drawings which form a part hereof, and in which is shown by way of illustration various embodiments in which the invention may be practiced. It is to be understood that other embodiments may be utilized and structural and functional modifications may be made without departing from the scope of the present invention.

Figure 1:
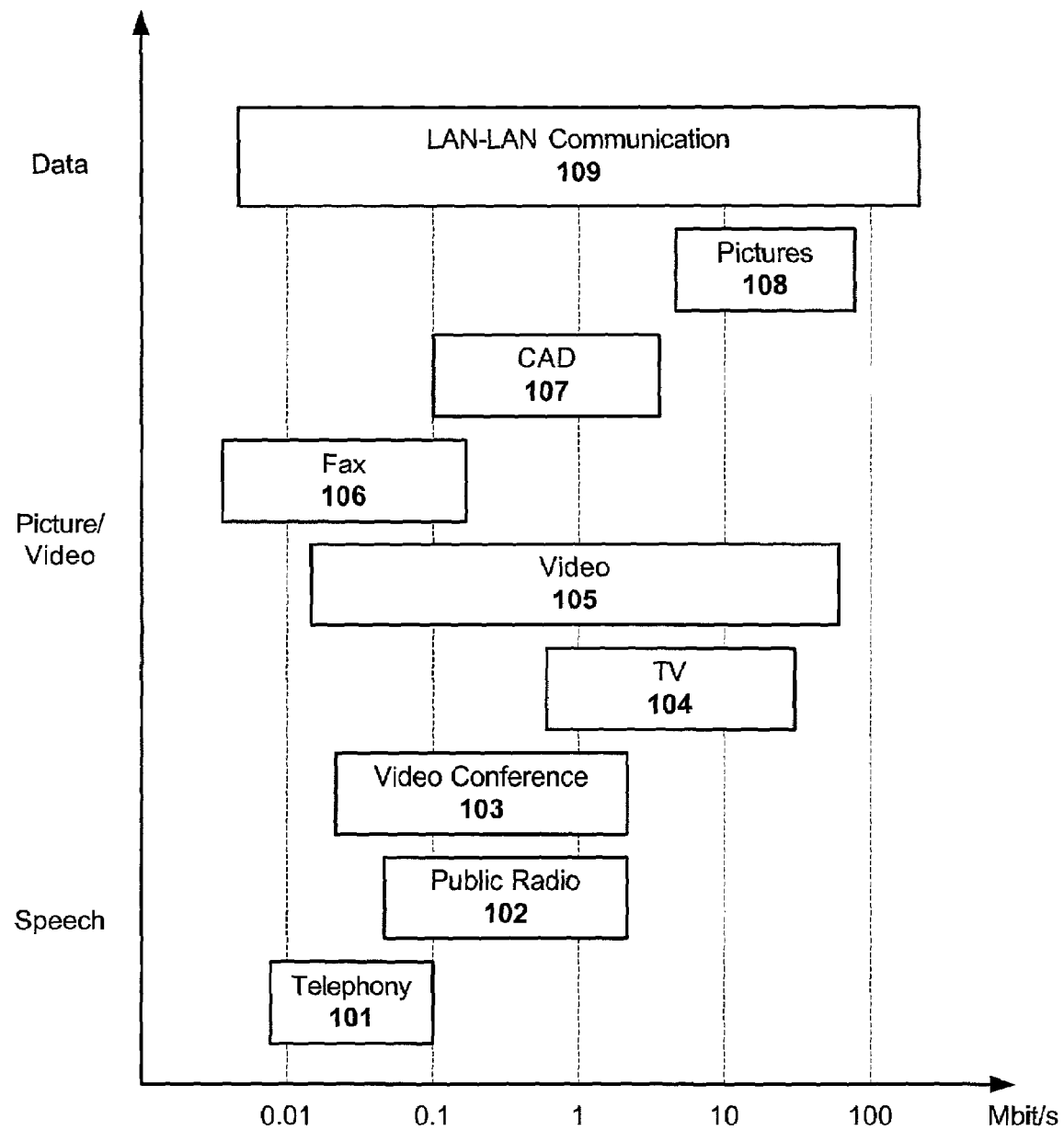
FIG. 1 illustrates the bandwidth requirements for various data formats under an embodiment of the invention.

When a Bluetooth connection is made through an access point, a user will typically transmit or receive some type of content through the access point. FIG. 1 illustrates many of the formats in which a Bluetooth access point will transmit among connected users. Furthermore, FIG. 1 illustrates the general bandwidth requirements for the listed formats. The "y-axis" of the graph in FIG. 1 is labeled in terms of a data type, and it's respective bandwidth requirements, where "speech" is shown near the bottom, thus requiring fewer bandwidth resources. Just above "speech" is the label "Picture/Video," which would require greater bandwidth resources, while "Data", labeled towards the top of the y-axis, would require the largest bandwidth requirement. The "x-axis" of the graph of FIG. 1 labels the bandwidth rates, ranging from zero to over 100 Mbit/s. The values for the illustrated formats (101–109) are given in approximate terms, and may vary slightly from the cited values given, depending on the specific usage.

Telephony 101 requires the lowest bandwidth; communication in this format approximately requires just under 0.01 Mbit/s to 0.1 Mbit/s. Next is the Public Radio format 102, which requires about 0.05 Mbit/s to 3 Mbits/s. The picture/video formats are shown in FIG. 1 as Video Conference 103, TV, 104, and Video 105. The bandwidth ranges for these formats range from under 0.01 Mbit/s to over 60 Mbit/s. Likewise, data formats Fax 106, CAD 107, Pictures 108 and LAN—LAN Communication 109 are shown in FIG. 1 having bandwidth requirements from under 0.01 Mbit/s to over 100 Mbit/s. It is understood that while formats were described as "Picture/Video" or "Data", the transmission of related data may include different designations or combinations of this data.

The core portion of Bluetooth communication occurs in the protocol stack. The stack allows devices to locate, connect to, and exchange data with each other and to execute interoperable, interactive applications against each other. The elements of the stack are logically partitioned into three main groups: (1) the transport protocol group, (2) the middleware protocol group and (3) the application group. The transport protocol group is composed of the protocols designed to allow devices to locate each other, and to create and configure and manage both physical and logical links that allow higher layer protocols and application to pass data through. The protocols include the radio, baseband, link manager, logical link and adaptation and the host controller interface. The host controller interface defines formats for packets that cross a host interface and associations between these packets.

The middleware protocol group contains additional transport protocols to allow existing and new applications to operate over Bluetooth links. The middleware protocol group includes both third-party and industry standard (as well as SIG) protocols developed for Bluetooth wireless communication. The protocols include Internet related protocols, wireless application protocols, object exchange protocols, and the like. Other protocols including RFCOMM, packet-based telephony control, and service discovery protocol are also applicable.

The Application group consists of actual applications that make use of Bluetooth links. The applications can include legacy applications that are unaware of Bluetooth transports (e.g., modem dialer application, web browsing client) or they might be aware of Bluetooth wireless communication (e.g., telephony control protocol). Each of these protocols and their configuration are discussed in further detail in Brent A. Miller and Chatschik Bisdikian, *Bluetooth Revealed* (Prentice Hall, 2001) (ISBN 0-13-090294-2).

Figure 2:
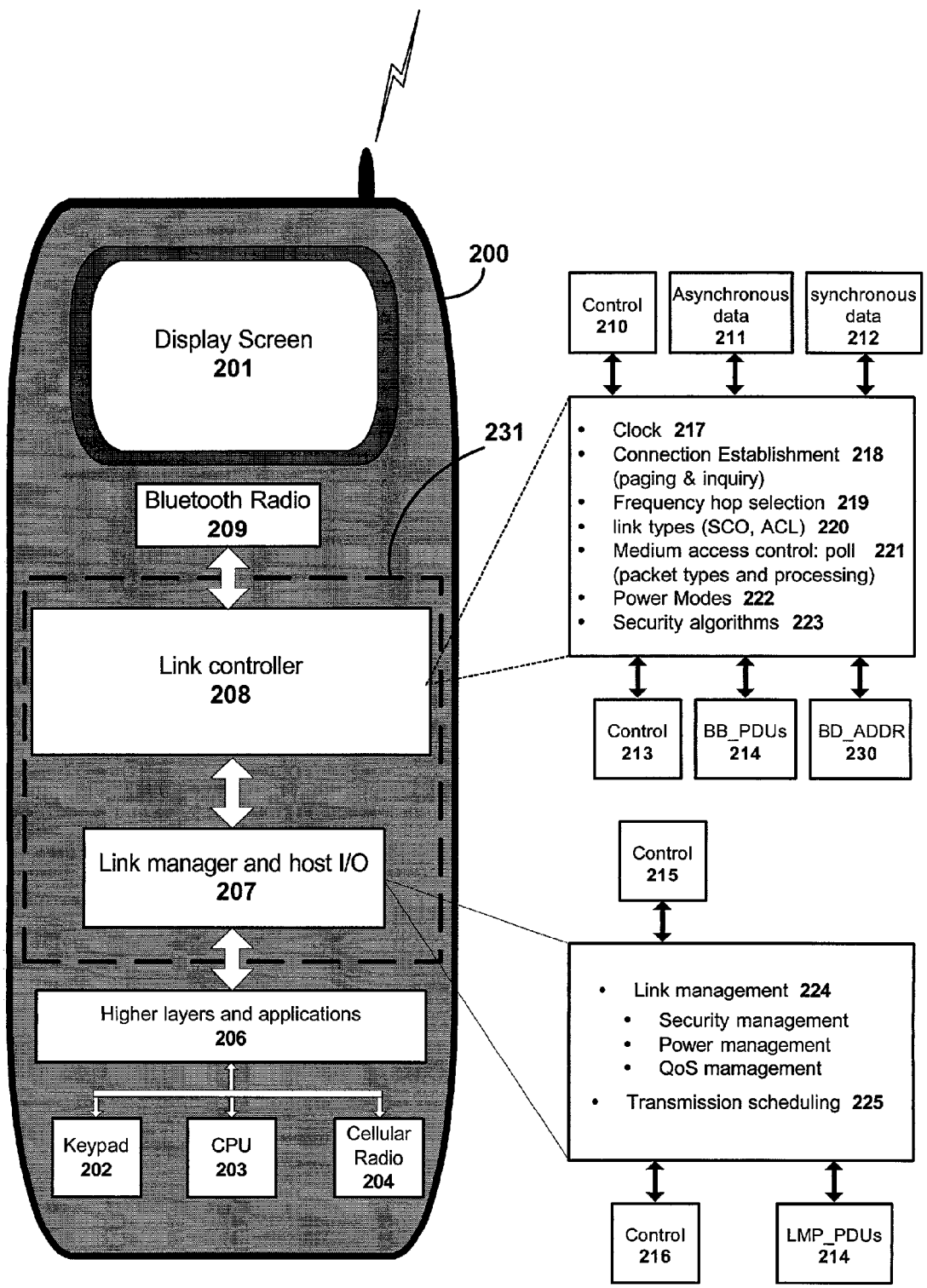
FIG. 2 illustrates an embodiment of a Bluetooth device, and the sub-components used under the embodiment.

FIG. 2 illustrates a Bluetooth device 200, and a portion of the baseband and link controller interface as it pertains to other shown portions of the device. Device 200 can be equipped with a keypad 202, CPU 203 and a cellular radio 204 that communicate over a bus throughout a Bluetooth device 200. Cellular radio 204 would be found typically in devices such as cell phones. Device 200 is also equipped with storage mediums and other buffers, which are not shown in the figure. The device is also equipped with a Bluetooth radio 209, which typically operates in the 2.4 GHz industrial, scientific, and medical (ISM) band.

Link controller 208 and link manager and host I/O 207 are two important aspects of the Bluetooth baseband 217. Baseband 217 provides such piconet and device control functions like connection creation, frequency-hopping sequence selection and timing; modes of operation such as power control and secure operation; and medium access functions like polling, packet types, packet processing and link types. Link controller 208 carries out the baseband protocols and other low-level link routines of the Bluetooth system. Link controller 208 uses the baseband to establish network connections, define link packet types and provide error connection. Link controller 208 comprises a number of modules, algorithms and devices, including clock 217, connection establishment module 218, frequency hop selection 219, link type 220 medium access control, power mode and security algorithms 223. Each of these will be discussed in greater detail below.

BD_ADDR 230 represents the Bluetooth device address, and is the most static entity of a Bluetooth device. BD_ADDR 230 is typically a single 48-bit address electronically "engraved" on each device. A device's BD_ADDR is globally unique among Bluetooth devices. The 48 bit address filed is partitioned typically into three parts: the lower address part (LAP), the upper address part (UAP) and the non-significant address part (NAP). The 24 bits of the UAP and the NAP constitute the organization unique identifier (OUI) part of the address that is assigned by numbering authorities to different organizations. The LAP is assigned internally by various organizations. Various parts of BD_ADDR 230 are involved in most every operation of baseband 217, including piconet identification, packet header error checking, and authentication and encryption key generation. The device address code (DAC) which is used during paging, is derived from the device BD_ADDR.

Clock 217 is typically a free-running 28-bit (native) Bluetooth clock, and runs at a frequency of about 3.2 KHz, which is about twice the nominal frequency hopping rate of 1,600 hops per second. Clock 217 assists in deciding when a device can or cannot transmit or listen for a transmission and at which frequency and for what types of information packets it transmits or listens. A slave device uses the value of the Bluetooth clock of a master to accomplish piconet communication. For example, a Bluetooth channel may be divided into timeslots, each 625 µs in length. The time slots are numbered according to the Bluetooth clock of the piconet master. A scheme may be implemented where a master and slave alternately transmit, wherein the master starts transmission in even-numbered slots only, and the slave starts its transmission in odd-numbered time slots only. The packet start would be aligned with the slot start. Each packet is transmitted on a different hop frequency. A packet nominally covers a single slot, but can be extended to cover up to five slots.

Connection Establishment 218 of link controller 208 typically performs a "page" and "inquiry" operation in establishing a Bluetooth connection. Under an embodiment of the invention, one device typically "invites" another device to join its piconet through the use of a page. The device issuing the page is called a paging device, and the device listening (or scanning) for pages is called the paged device. A paging device selects a new frequency at which to transmit a page (e.g. every 312.5 µs). During page scans, when a device listens for transmitted pages, a new listening frequency is selected (e.g., every 1.28 seconds). Typically, a paging device changes frequencies at a much higher rate than a paged device. And while the paged device uses its own clock to drive its frequency selection module (FSM), the paging device uses its best estimate of the clock of the paged device to drive its own FSM. The paging device may estimate the clock value of the paged device based upon the most recent communication between the devices. In the worst case, the paging device could use its own clock.

During page operation, a page hopping sequence is typically used. The sequence typically covers 32 unique response frequencies that are in a one-to-one correspondence to a current page hopping sequence (described below). A master and slave may use different rules to obtain the same sequence. The sequence is generated between the paging and paged device by using the 28 least significant bits of the address of the paged device as the address input to a respective frequency selection module (FSM). Further details of specific types of paging sequences are detailed in the Bluetooth Specification.

During "inquiry" of connection establishment 218 of link controller 208, device 200 "searches" for other devices or access points in its vicinity. Just as in paging, an inquiring device selects a new frequency at which to transmit an inquiry (e.g., every 312.5 µs). Inquired devices, executing inquiry scans, select a new listening frequency approximately every 1.28 seconds. Typically, an inquiring device changes frequencies at a much higher rate than an inquired device. Both the inquiring and inquired devices use their own clock (e.g., clock 217 in the case of device 200) to driver their FSM's. During the inquiry operation, an inquiry hopping sequence is used. Each inquiry transmission on a given frequency of the inquiry hopping sequence and each response to it are preceded by an inquiry access code (IAC). Typically there are 64 IAC's (including a general inquiry access code (GIAC)) associated with 64 reserved lower address parts (LAP). Excluding the GIAC, the remaining 63 IACs are referred to as dedicated IACSs (DIACs). The IAC LAPs will then belong to a set (e.g., 0x0201C, 0x020114, etc.), wherein no device can have an address whose Lap matches any of these reserved LAPs. Further details of inquiry operations are detailed in the Bluetooth specification.

It should be noted that while the specification does not define how IACs are to be used, they are intended to be used primarily as a filtering mechanism for identifying well-defined subsets of the devices that may receive inquiries. While all devices that execute inquiry scans generally use the GIAC to generate the inquiry-hopping frequency, only those devices whose receiver correlators are tuned to a particular IAC will receive and respond to inquiries that contain that particular IAC.

As mentioned previously, the hopping sequence used within a piconet is determined by the Bluetooth device address of the master (i.e., BD_ADDR) and the phase in the hopping sequence is determined by the Bluetooth clock of the master. In the execution of frequency hop selection 219, there are 5 general types of hopping sequences defined:

(1) Page hopping sequence—containing 32 different wake-up frequencies distributed equally with a period (segment) length of 32.
(2) Page response sequence—covers 32 unique response frequencies that are all in a one-to-one correspondence to a current page hopping sequence. The master and slave may be configured to use different rules to obtain the same sequence.
(3) Inquiry sequence—uses 32 unique wake-up frequencies distributed equally with a period (segment) length of 32.
(4) Inquiry response sequence—covers 32 unique response frequencies that are all in an one-to-one correspondence to a current inquiry hopping sequence.
(5) Channel hopping sequence—has a longer period length, and distributes the hop frequencies equally over short periods of time to satisfy the regulatory requirements for the frequency-hopping sequence.

Within device 200, two types of links 220 are typically found: Synchronous Connection-Oriented (SCO) link and Asynchronous Connectionless link (ACL). SCO is a point-to-point link between a master and a single slave in the piconet. The master maintains the SCO link by using reserved slots at regular intervals, and thus can be analogous to a circuit-switched connection between the master and slave. The SCO link typically supports time-bounded information like voice. The ACL link is a point-to-multipoint link between the master and all the slaves participating on the piconet. In the slots not reserved for the SCO link(s), the master can establish an ACL link on a per-slot basis to any slave. It can thus function as a packet-switched connection between the master and all active slaves participating on a piconet.

FIG. 2 also discloses the acceptance of asynchronous data 211 and synchronous data 212 or voice. Under an embodiment of the invention, up to three simultaneous synchronous voice channels may be supported. Also, a channel that simultaneously supports asynchronous data and synchronous voice may be utilized. Typically, the asynchronous channel can support an asymmetric link of 723.2 kb/s maximum in either direction, while permitting 57.6 kb/s in the return direction, or a 433.9 kp/s symmetric link. Control lines 210 and 213 provide additional inputs to link controller 208.

Additionally, when device 200 resides on a particular frequency, device 200 may further transmit a baseband packet data unit BB_PDU 214. BB_PDU 214 is typically a single packetized piece of information, and is strictly constrained within the time device 200 resides at a frequency. However, the resident time at a frequency may also occupy multiple slots, thus permitting multi-slot BB_PDU transmissions to occur. In such a case, a next frequency selected is the one that would have been used if single-slot transmissions had occurred instead. In other words, frequencies from the channel hopping sequence are selected on a slot basis, although the frequency hops themselves occur on a BB_PDU basis.

Medium access control 221 includes link control packets including ID, NULL, POLL and FHS packets used in inquiries and pages. Access control 221 performs further processing of packet types and may work in conjunction with BB_PDU to provide indication of signaling or payload-carrying packets. Device 200 is also equipped for different power modes 222 to enable "sleep" modes for device 200. Security algorithms 223 may also reside in device 200 to provide security between communicating devices, or encoding/encryption on transmitted data or links.

Turning to the link manager and host I/O 207, the link managers exchange messages among external devices communicating with device 200 to control the Bluetooth link among the devices. The communication protocol among link managers is known as the link manager protocol (LMP), and the messages exchanged among communicating link managers are shown as LMP_PDUs 214. Typically, LMP does not carry application data. Control data 215, 216 received at the link manager allows the LMP to either communicate with the link manager in other devices using LMP_PDUs or to send control signals to device 200 baseband 217 and radio layers.

Link management 224 further provides security management similar to security algorithms 224 found in link controller 206; the security management may provide additional link configuration between devices such as device authentication. The power management feature of link management 224 allows device 200 to regulate and/or reserve power during functionality. Typical power management modes include "sniff", "hold" and "park."

Quality of service (QoS) management identifies the traffic flow specification for device's 200 traffic in an outgoing direction over a channel. To allow control of bandwidth assignments of traffic in ACL transmissions, the maximum polling interval for device 200 may be adjusted as needed by a linked master. The adjustment may also be made to provide maximum access delay of ACL BB_PDUs. Typically a master communicating with device 200 can enforce a new maximum poling interval using an LMP_quality_of_service PDU. In such a case, device 200, acting as a slave, cannot reject this adjustment of the polling interval. Alternately, a request for changing the polling interval via LMP quality_of service_reqI PDU can be accepted or rejected. Both of the LMP_PDUs also contain data specifying the number of times ($N_{BC}$) that each broadcast packet is to be repeated. Since this parameter relates to the operation of the entire piconet, $N_{BC}$ is typically meaningful only when it is transmitted from a master.

Figure 2A:
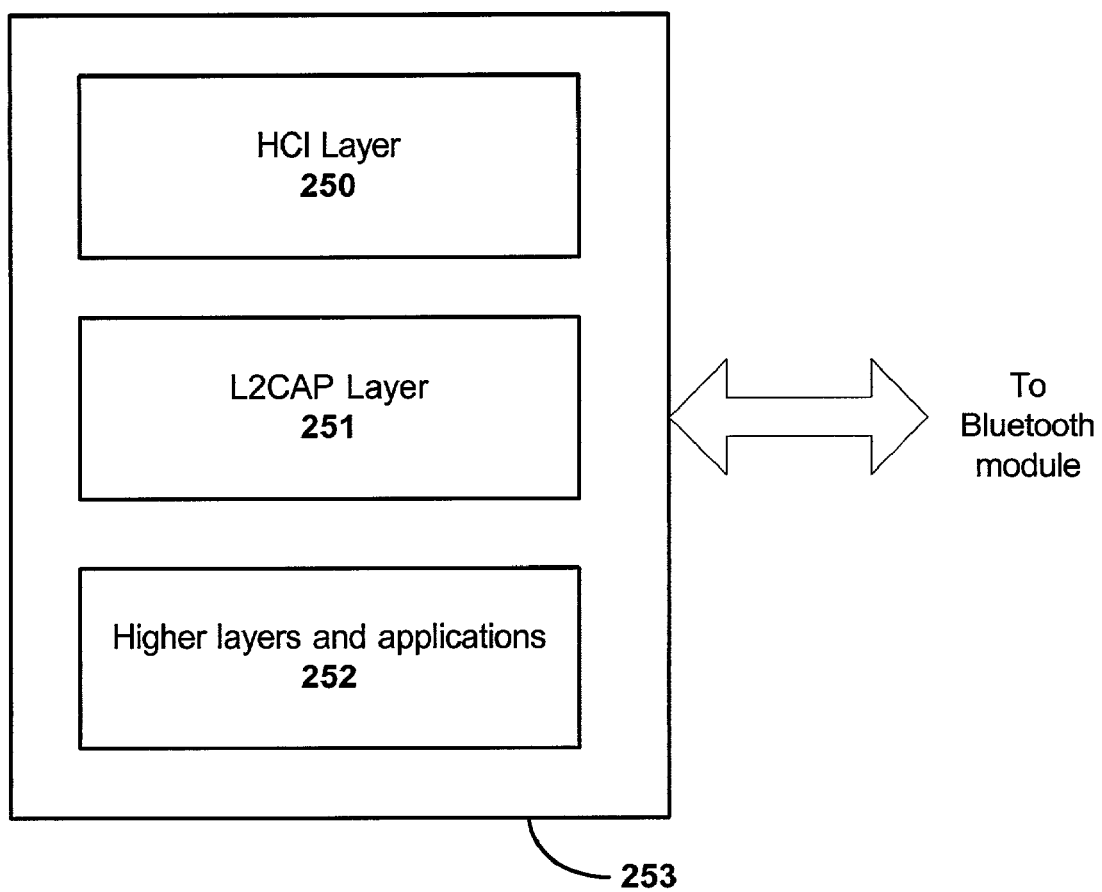

FIG. 2A discloses an embodiment of a host controller 253 which interacts with a host and Bluetooth module hardware and firmware. Host controller 253 comprises generally of a host controller interface (HCI) layer 250, a logical link control and adaptation protocol (L2CAP) layer 251, and higher layers and applications 252. HCI layer 250 is supplemented with a series of HCI transport protocols, which are used to transfer HCI data across various physical connections (e.g., USB, RS-232, etc.). HCI 250 contains a command interface to the baseband controller and link manager and access to hardware status. HCI 250 further contains control and event registers. For more detail regarding the specific structures and configurations of the HCI and L2CAP layers, consult the Bluetooth specification.

The primary goal of the L2CAP layer 251 is to minimize the involvement of lower-layer transport protocols with the upper layers and applications 252. This way, many of the developed higher-layer transport protocols and applications may be executed over Bluetooth links with minimum modification. L2CAP 250 deals primarily with ACL-type packets and are referred to as L2CAP_PDUs, and can be carried on ACL BB_PDUs 214 transmissions. L2CAP performs tasks including multiplexing, segmentation and reassembly, as well as group mapping onto networks (i.e., piconets). Additionally, the L2CAP layer 250 further supports the exchange of QoS information. The L2CAP_PDUs may be utilized in connectionless (CL) or connection-oriented (CO) systems.

Figure 3:
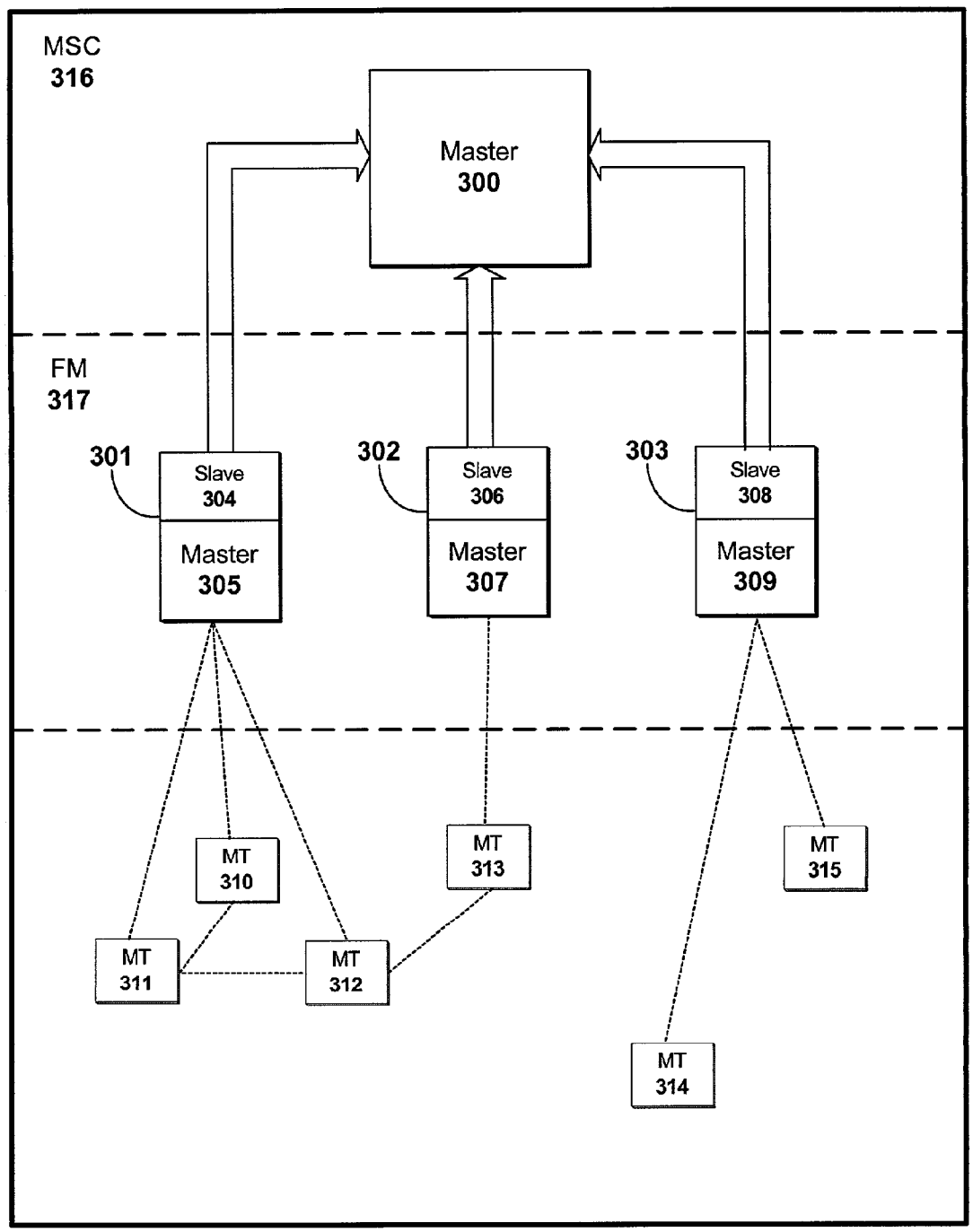
FIG. 3 illustrates a Bluetooth system under an embodiment of the present invention.

FIG. 3 illustrates an embodiment of the invention showing a Bluetooth routing scheme among mobile terminals (MT) 310–315, fixed masters (FM) 301–303 and a master 300 mobile switching center 316. MSC 316 and associated master 300 keeps track of devices within the system and acts as a relay for routing when required, and is typically joined by fixed connections to fixed masters 317. The illustrated fixed masters 301–303 are typically positioned at fixed intervals throughout an area, and provide interfaces between MSC 316 and other Bluetooth devices (e.g., MTs). MTs 310–315 are typical Bluetooth device, communicating and performing tasks in piconets and scatternets throughout the system.

Each of the three layers in FIG. 3 are connected in a way that the MTs are slaves to the FM 317, wherein the FM 317 is a slave to MSC 316. FMs 301–303 are shown in FIG. 3 as performing slave functions 304, 306, 308 to the master 300, while also serving as master 305, 307, 309 to the MTs. MTs may also be configured, according to the capability of each MT, to act as slaves to other MTs, illustrated in MTs 310–313.

FIG. 4A discloses an embodiment of the invention, wherein a Bluetooth-enabled device 401 establishes a connection with a Bluetooth access point 400, illustrated as a fixed master. Under this embodiment, device 401, shown as a Bluetooth enabled laptop, "inquires" the access point 400, wherein the master establishes a connection with the devices baseband for communication. Access point 400 may also "page" for connections as well as employ any other Bluetooth profiles in establishing connections (e.g. generic access profile, SDAP, serial port, GOEP, etc.) Once connected, access point 400 records device 401 class of device (CoD) field; FIG. 4A shows device 401 having CoD of 0x0201C which identifies the device as "Laptop" under the embodiment.

Access point 400 further sets the levels of bandwidth available for connected devices. This is shown in the bar above the table in FIG. 4A as having a value from 0 to 921 kbps. Since device 401 is the sole connected device, all of the bandwidth is available for use. However, access point 400 also assigns a weighted value (Wt) to the bandwidth requirement of device 401, as well as a minimum bandwidth requirement (Min) for the device. The weighted value (Wt) may be automatically assigned for each terminal type, but it may also be some other value that can be used to classify incoming terminals. Bandwidth requirements may also be stored for each designated CoD. Additionally, device BD_ADDRs (or other authentication sources) may impose additional requirements to access point 400. These values may be set through the implementation of management software in access point 400. Additional values may be assigned for file types that are to be transmitted (see FIG. 1). In the embodiment shown, device 401 is assigned a Wt of 3, with a minimum bandwidth requirement (Min) of 200 kbps. It is understood that while "minimum" bandwidth rates are discussed in this embodiment, other operative rates may be designated for a device. Thus, a "minimum bandwidth rate" should be interpreted as meaning a rate below which the user does not desire to engage in transmission. The rate can be set by the user, or by the capabilities of the device itself.

In FIG. 4B, a second device 402 is connected to access point 400. Device 402 is shown having CoD of 0x020114, identifying it as a Palm™ sized PDA. Device 402 has a Wt of 2, with a minimum bandwidth requirement of 100 kbps. Once connected, access point 400 uses the established Min for device 401 and Min for the newly connected device 402 to determine bandwidth allocation. If the available bandwidth exceeds the sum of the Min of devices 401 and 402, connection for device 402 will be granted. Once granted, access point 400 partitions the bandwidth and calculates the maximum data rate allowable for both devices. In FIG. 4B, device 401 is assigned a rate of 573 kbps, while device 402 is assigned a data rate of 348 kpb.

Figure 4C:
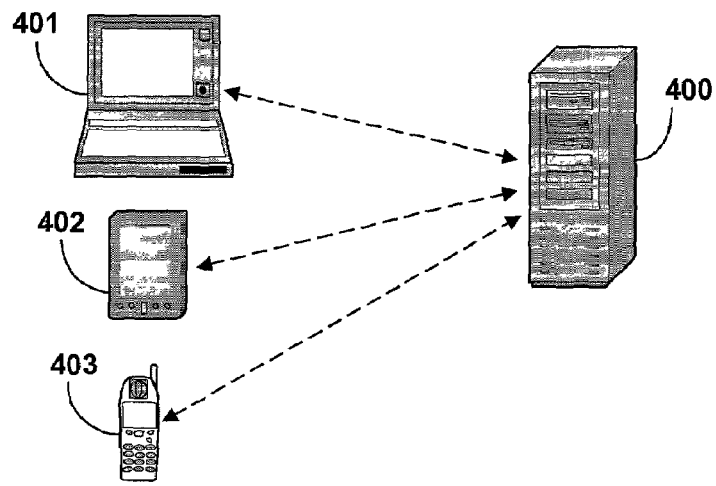
FIG. 4C illustrates a connection among a laptop, a PDA, a cellular phone, and a Bluetooth access point, and further discloses an exemplary bandwidth distribution under an embodiment of the present invention.

FIG. 4C discloses a third device 403 being connected to access point 400. Device 403 is identified through its CoD 0x420204 as being a cellular phone, with a Wt value of 1, and a minimum bandwidth requirement of 40 kbps. Similar to FIG. 4B, access point 400 determines whether the maximum bandwidth available exceeds the sum of Min values for devices 401–403. If connection is granted, then each device is calculated a new individual data rate. Next, the appropriate Min worth of bandwidth is assigned for each CoD. Following that, access point 400 proceeds one by one through the devices, with the oldest connection (device 401) being first, and assigns additional bandwidth for each CoD class device in accordance with the weighted distribution. The newly connected device is assigned the remainder of the available bandwidth. FIG. 4C illustrates the bandwidth distribution as device 401 being assigned 492 kbs, device 402 being assigned 293 kbps, and device 403 getting 136 kbps.

Figure 4D:
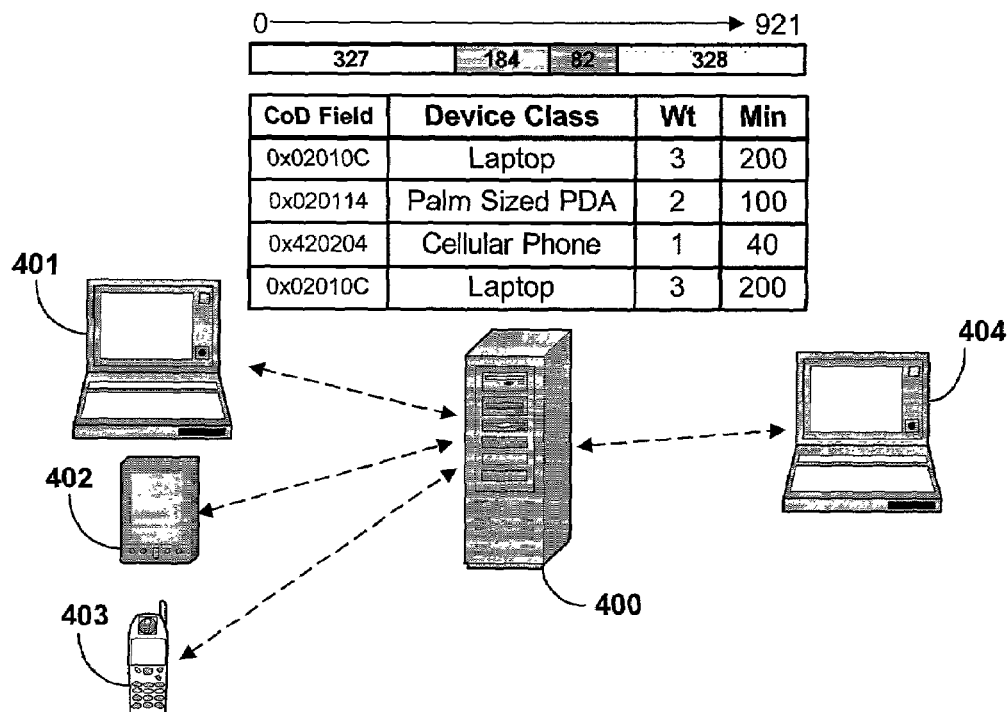
FIG. 4D illustrates a connection among a laptop, a PDA, a cellular phone, a second laptop, and a Bluetooth access point, and further discloses an exemplary bandwidth distribution under an embodiment of the present invention.
Figure 4E:
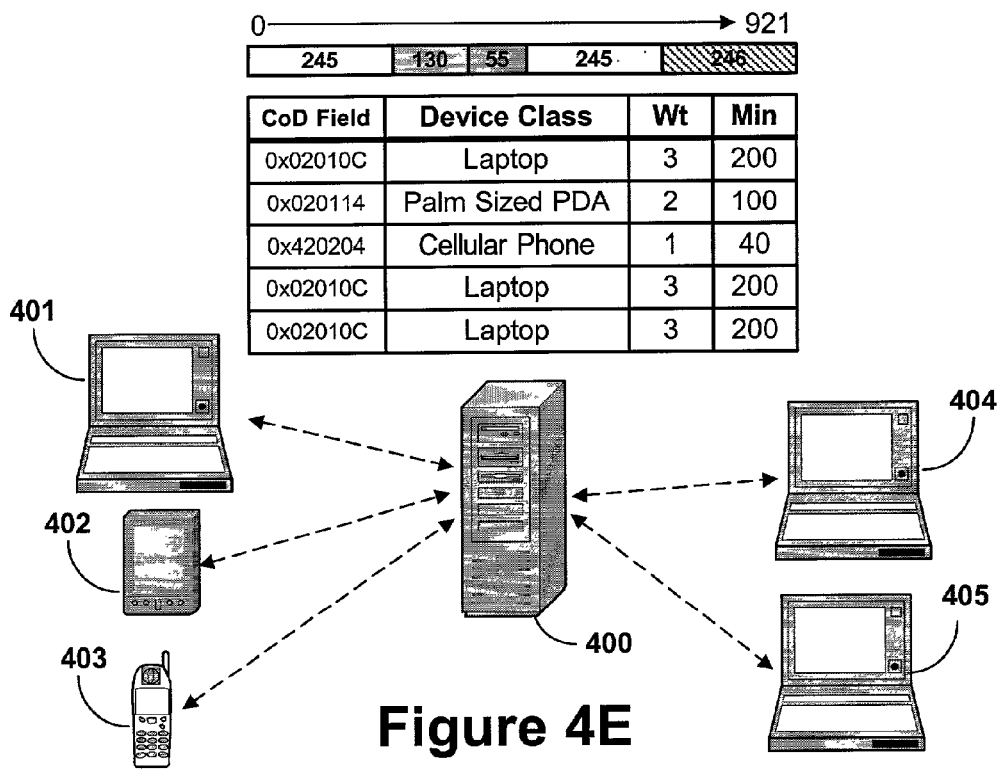
FIG. 4E illustrates a connection among a laptop, a PDA, a cellular phone, a second and third laptop, and a Bluetooth access point, and further discloses an exemplary bandwidth distribution under an embodiment of the present invention.

FIG. 4D illustrates a fourth device 404 getting connected to access point 400 (having CoD 0x0201C indicating a laptop). Once again, access point 400 determines whether the maximum bandwidth available exceeds the sum of Min values for devices 401–404. If connection is granted, then each device is calculated a new individual data rate. Next, the appropriate Min worth of bandwidth is assigned for each CoD. Following that, access point 400 proceeds one by one through the devices, with the oldest connection (device 401) being first, and assigns additional bandwidth for each CoD class device in accordance with the weighted distribution. The newly connected device is assigned the remainder of the available bandwidth. FIG. 4D illustrates the bandwidth distribution as device 401 being assigned 327 kbs, device 402 being assigned 184 kbps, device 403 being assigned 82 kbps, and device 404 getting 328 kbps. FIG. 4E illustrates the additional connection of a fifth device 405, wherein the same process is executed as described above. Accordingly the bandwidth is again reapportioned with device 401 being assigned 245 kbs, device 402 being assigned 130 kbps, device 403 being assigned 55 kbps, device 404 being assigned 245 kbps, and device 405 getting 246 kbps.

Figure 4F:
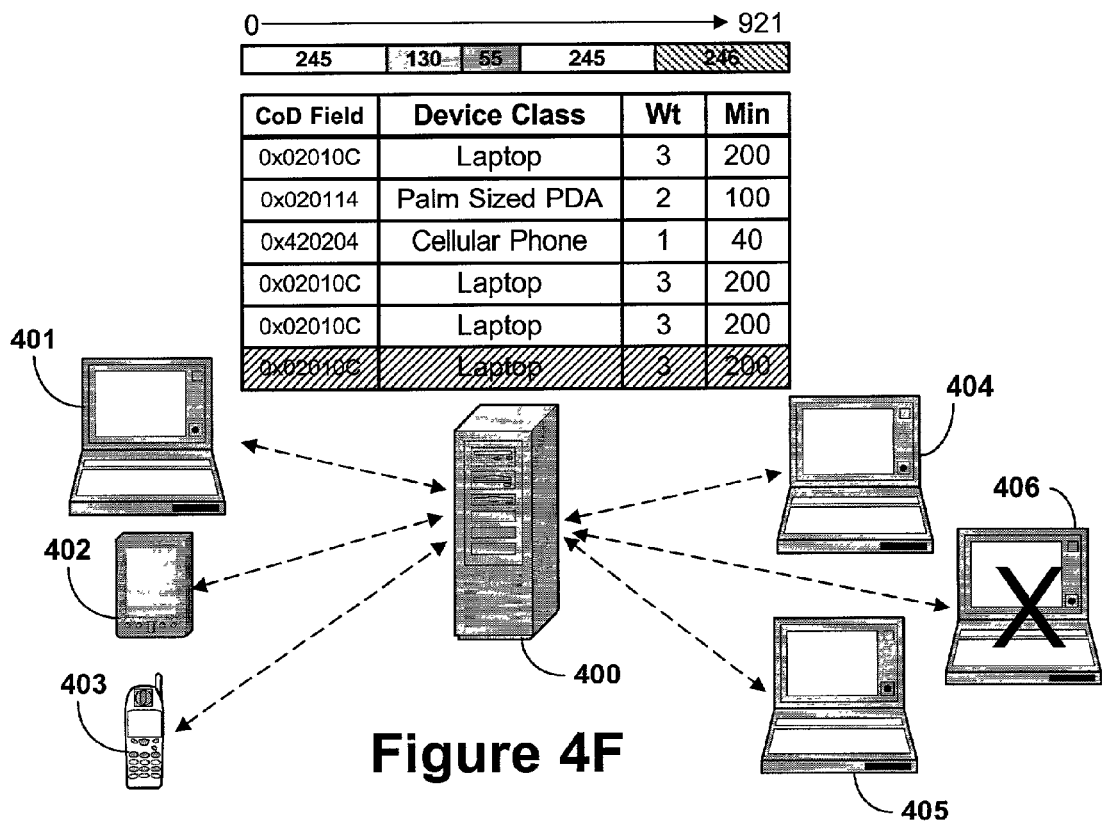
FIG. 4F illustrates a connection among a laptop, a PDA, a cellular phone, a second, a third, and a rejected fourth laptop, and a Bluetooth access point, and further discloses an exemplary bandwidth distribution under an embodiment of the present invention.

FIG. 4F illustrates a case where the presence of device 406 exceeds the capability of access point 400. As all of the devices shown in FIG. 4E remain connected, device 406 attempts to connect to access point 400. In this embodiment, the sum of the Min values for all devices, including device 406, now exceed the maximum bandwidth allowed at the access point. In other words, the collective data rate of 940 kbps (sum of Mins for devices 401–406) is greater than the maximum bandwidth of 921 kbps. In this case, device 406 is denied connection as an incoming terminal, and the remaining devices retain their rates previous to device 406 attempting a connection.

Figure 4G:
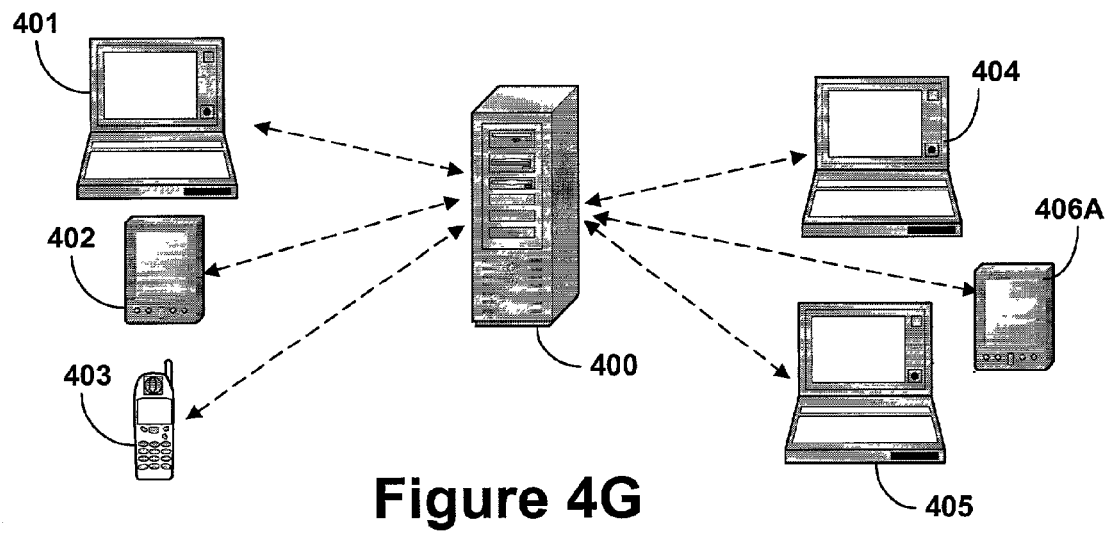
FIG. 4G illustrates a connection among a laptop, a PDA, a cellular phone, a second, a third, an accepted fourth laptop, and a Bluetooth access point, and further discloses an exemplary bandwidth distribution under an embodiment of the present invention.

FIG. 4G now illustrates an attempted connection by another device 406A, except that this time device 406A has a lower bandwidth requirement (100 kbps). This being the case, the sum of the entire device Min values (401–406A) do not exceed the maximum allowable bandwidth (840 kps<921 kbps), and device 406A is granted a connection. Once a connection is established, each device is calculated a new individual data rate. Next, the appropriate Min worth of bandwidth is assigned for each CoD. Following that, access point 400 proceeds one by one through the devices, with the oldest connection (device 401) being first, and assigns additional bandwidth for each CoD class device in accordance with the weighted distribution. The newly connected device is assigned the remainder of the available bandwidth. Accordingly the bandwidth is again reapportioned with device 401 being assigned 218 kbs, device 402 being assigned 111 kbps, device 403 being assigned 45 kbps, device 404 being assigned 218 kbps, device 405 being assigned 218 kbps and device 406A obtaining the remaining 111 kbps. Thus all of the connected devices will have a workable data rate in their transmissions.

It is understood that variations of the preferred embodiment may also be implemented by those skilled in the art to obtain comparable results. While the connections to the access point, and the resulting bandwidth reapportionment, may be obtained on an ad-hoc basis, the use of storage databases may also be used to accelerate the apportionment of bandwidth. For example, a storage database may contain the information shown in the tables of FIGS. 4A–4G, wherein one database may contain stored CoD values, a second database may contain stored minimum bandwidth requirements, a third database may contained stored addresses, while a fourth may contain Wt values. Numerous combinations of databases may be used in accordance with the requirements of the system.

By having a stored database, access point 400 may be able to retrieve data quickly without waiting for a complete transmission of requirements. Address-specific implementations may be employed according to the methods described above to provide customized bandwidth requirements for specific users. Thus, users desiring a higher bandwidth requirement than is specified for the device may transmit that requirement to access point 400 to obtain a unique operative bandwidth requirement. Administrators of the access point may correlate various databases with each other to provide further customization of transmissions through the access point.

Figure 5:
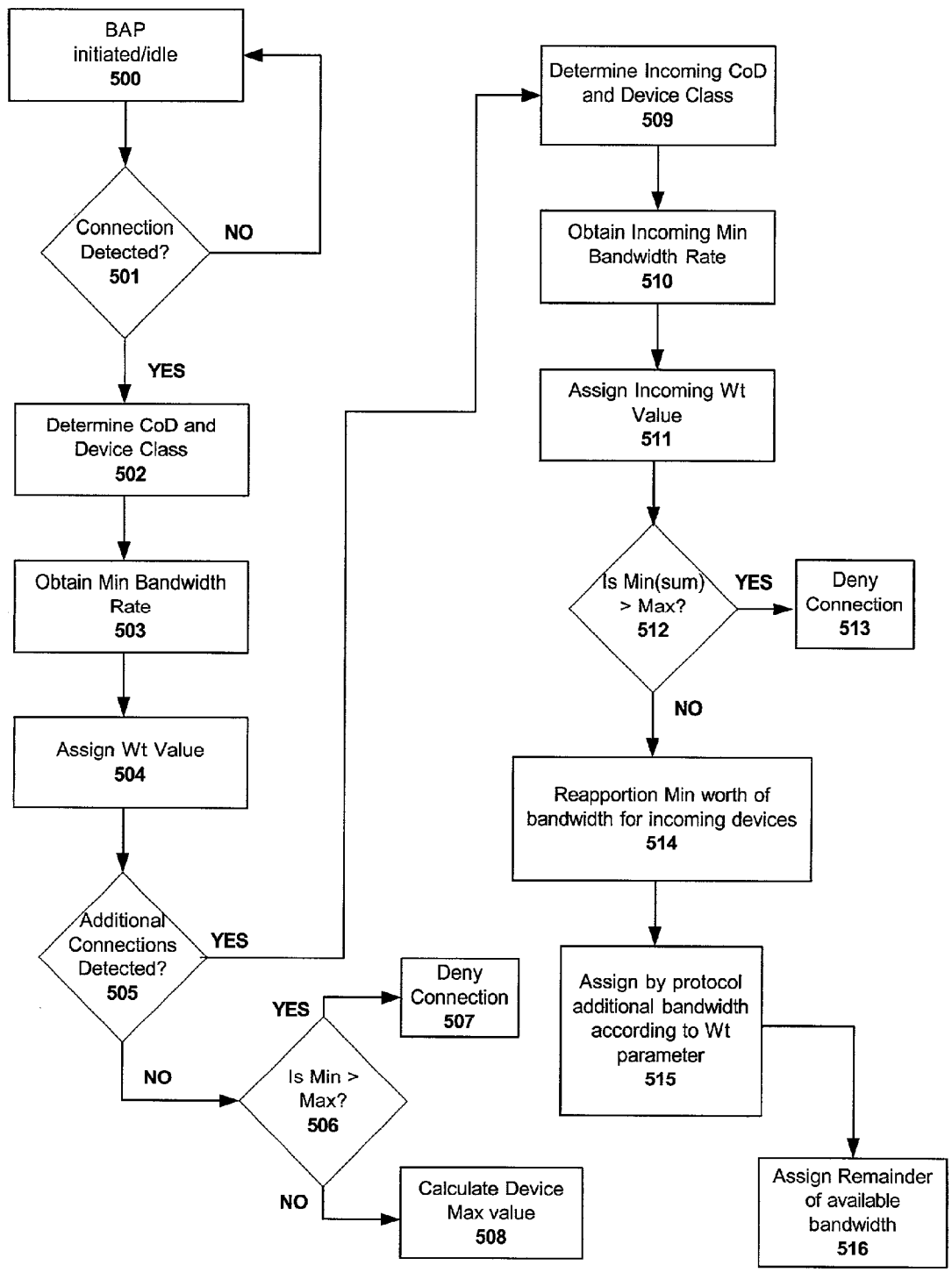
FIG. 5 is a flowchart illustrating an embodiment of the invention.

FIG. 5 is a flowchart illustrating an embodiment of the invention. In step 500, the Bluetooth access point (BAP) is configured in an initialized mode (i.e., upon startup) or an idle mode. In step 501 the BAP detects whether connections are being made. If no connections exist, the BAP remains in an idle state. However, once a connection is detected, the process moves to step 502, wherein the BAP determines the CoD and device class of the incoming device. Next, a Min bandwidth rate is established in 503, and a Wt value is subsequently assigned in 504.

BAP then determines if any other connections are being attempted in step 505. If no, step 506 determines whether the Min value exceeds the maximum bandwidth available at the BAP (Max). If the requesting device has a Min that exceeds the Max value, the BAP denies the connection in step 507. If the device requires less bandwidth (i.e., Min<Max) than is provided, the BAP calculates the device Max value in step 508 for the connection. The value is determined similarly to that described above. It is understood that at this point, only one device is connected to the BAP. Additional algorithms may be provided to further allocate bandwidth according to transmitted file types (e.g., video, text, sound, etc.).

If step 505 determines that additional connections are being requested, the process moves to step 509, where the incoming CoD and device class is determined. In steps 510 and 511 the BAP obtains incoming Min bandwidth rate and assigns incoming Wt value for the newly requesting device. In step 512, the BAP makes a determination of whether the sum of the Mins of all connected devices (Min(sum)) is greater than the maximum allowable bandwidth (Max). If so, the incoming connection request is denied instep 513. Otherwise, the process continues to step 514, where the BAP reapportions a Min worth of bandwidth for the connected device(s) as well as the incoming devices. Once the Min for each device is established, step 515 assigns by protocol additional bandwidth according to Wt parameter of each device. It is understood that the protocol may be defined in different ways, (e.g., starting from the oldest connection and proceeding to the newest, proceeding according to CoD, etc). Finally, step 516 assigns the remainder of the available bandwidth to the newly connected device.

It is further understood that as additional connections occur at the BAP, the same iterations are performed from steps 509 to 516. For each incoming device. Once the Min(sum) value exceeds the Max bandwidth for the BAP, the BAP denies all incoming connections until other devices break their connections.

Although illustrative embodiments have been described herein in detail, it should be noted and understood that the descriptions and drawings have been provided for purposes of illustration only and that other variations both in form and detail can be made thereupon without departing from the spirit and scope of the invention. The terms and expressions have been used as terms of description and not terms of limitation. There is no limitation to use the terms or expressions to exclude any equivalents of features shown and described or portions thereof.

What is claimed is:

1. A method for dynamically allocating bandwidth, comprising:

receiving at a receiving device, wireless short-range radio communication link connection requests among a plurality of devices;

receiving and storing a class of device (CoD) for each of the plurality of requesting devices, each said CoD being related to a corresponding value of a minimum operative bandwidth rate for a respective one of the requesting devices;

obtaining a minimum operative bandwidth rate corresponding to each of the received CoDs of the requesting plurality of devices;

obtaining a weighted value corresponding to each of the received CoDs of the requesting plurality of devices;

assigning the respective weighted values as additional bandwidth to each of the connected devices;

determining whether the sum of the minimum operative bandwidth rates for each of the requesting devices corresponding to each of the received CoDs exceeds a maximum bandwidth allowable for the receiving device; and connecting and assigning at least the respective minimum operative bandwidth rates to each of the connected devices if the sum of the minimum operative bandwidth rates for each of the devices does not exceed the maximum bandwidth allowable for the receiving device, wherein the device which was last in connection is assigned the remainder of the bandwidth, after the weighted bandwidth has been assigned.

2. The method according to claim 1, wherein the protocol includes assigning bandwidth sequentially according to time of connection, starting from the first-connected device.

3. The method according to claim 1, wherein connection is denied to an additional requesting device, if the operative bandwidth requirements of the additional requesting device would cause the sum of the operative bandwidth rates to exceed the maximum allowable bandwidth rate for the receiving device.

4. A method of reapportioning bandwidth, comprising:
- receiving at a wireless short-range radio communication link access point, a class of device (CoD) for each of a plurality of devices connected to the access point;
- obtaining a value of a minimum operative bandwidth rate and a weighted value corresponding to each said CoD;
- assigning a weighted value to each of the plurality of devices connected to the access point corresponding to each device's respective CoD;
- determining a minimum operative bandwidth requirement for each of the plurality of devices corresponding to each device's respective CoD;
- reapportioning bandwidth among each of the devices according to their minimum operative bandwidth requirements corresponding to each device's respective CoD; and
- assigning additional bandwidth to each of the devices according to the weighted value corresponding to each device's respective CoD.

5. The method according to claim 4, wherein the weighted value is associated with each device's class of device (CoD).

6. The method according to claim 4, wherein the operative bandwidth requirement is associated with each of the devices' class of device (CoD).

7. The method according to claim 4, wherein the operative bandwidth requirement is associated with each of the devices' device class.

8. The method according to claim 4, wherein the steps of reapportioning and assigning additional bandwidth is are repeated each time additional devices are connected to the access point.

9. A system for reapportioning bandwidth, comprising:
- a wireless short-range radio communication link interface, wherein said interface receives requests from a plurality of remote devices, and further receives a class of device (CoD) value from each requesting device;
- a storage medium, communicatively coupled to the interface, wherein said storage medium stores the received CoD value from each requesting device and stores minimum bandwidth requirement (Min) values corresponding to each of the received CoD values; and
- a processor, communicatively coupled to the storage medium, wherein said processor calculates a weighted value for each CoD value received, and further initiates redistribution of bandwidth for the short-range radio communication link according to the weighted values and Min values of the plurality of remote devices, wherein the device which was last in connection is assigned the remainder of the bandwidth, after the weighted bandwidth has been assigned.

10. A system according to claim 9, wherein said requests for connection are granted if the sum of all Min values for all requesting devices do not exceed the maximum bandwidth for the short-range radio communication link.

11. A system according to claim 10, wherein incoming requests for connection are not granted if the sum of all Min values for all previously connected devices, plus the Min value for an incoming request, exceeds the maximum bandwidth for the short-range radio communication link.

12. A system according to claim 10 wherein bandwidth is reapportioned among each connected device according to each device's Min value.

13. A method for allocating bandwidth, comprising:
- storing device information data including class of device (CoD) values for wireless devices and corresponding minimum bandwidth requirements;
- receiving at a wireless short-range radio communication link access point, connection requests among a plurality of wireless devices and a CoD value for each requesting device;
- correlating the received CoD value from each requesting device with the corresponding minimum bandwidth requirement to establish a bandwidth requirement for each of the requesting devices;
- determining whether the sum of the bandwidth requirement for each of the requesting devices exceeds the maximum bandwidth allowable for the access point; and
- connecting and assigning bandwidth rates to each of the requesting devices if the sum of the bandwidth requirements for each of the devices does not exceed the maximum bandwidth allowable for the access point, wherein the device information data includes a weighted value assigned to a requesting device and wherein additional bandwidth is assigned by protocol to each of the connected devices according to the weighted value.

14. The method according to claim 13, wherein the device information data is stored in the access point and includes class of device (CoD) data.

15. The method according to claim 13, wherein the device information data is stored in the access point and includes a minimum bandwidth requirement value.

16. The method according to claim 13, wherein the protocol includes assigning bandwidth sequentially according to time of connection, starting from the first-connected device.

17. The method according to claim 16, wherein the device which was last in connection is assigned the remainder of the bandwidth, after the weighted bandwidth has been assigned.

18. The method according to claim 13, wherein connection is denied to an additional requesting device, if the bandwidth requirements of the additional requesting device would cause the sum of the bandwidth rates to exceed the maximum allowable bandwidth rate for the access point.

19. An access point for reapportioning bandwidth, comprising:
- a storage medium, wherein the storage medium stores wireless device data including class of device (CoD) values for wireless devices and corresponding minimum bandwidth requirements;
- a short-range radio communication link interface, communicatively coupled to the storage medium, wherein said interface receives requests for connection from remote devices and a CoD value for each requesting device; and
- a processor, communicatively coupled to the link interface, wherein said processor calculates bandwidth apportionment by correlating the received CoD value from each requesting device with the corresponding minimum bandwidth requirement and adding the bandwidth requirements for each respective device requesting connection, verifying that the sum of bandwidth requirements does not exceed the maximum allowable bandwidth for the link interface, and connecting and apportioning additional bandwidth to each requesting device according to a weighted value.

20. The access point according to claim 19, wherein the wireless device data further comprises a class of device (CoD) number.

21. The access point according to claim 19, wherein the processor allocated bandwidth to connected device according to a protocol.

22. The access point according to claim 21, wherein the protocol includes assigning bandwidth sequentially according to time of connection, starting from the first-connected device.

23. The access point according to claim 19, wherein the wireless device data further comprises a device class.

24. The access point according to claim 19, wherein the processor rejects requesting devices if their connection would cause the sum of bandwidth requirements to exceed the allowable bandwidth for the link interface.

* * * * *